United States Patent
Yang et al.

(10) Patent No.: US 6,747,435 B2
(45) Date of Patent: Jun. 8, 2004

(54) APPARATUS FOR CONTROLLING AN OPERATION OF MOTOR AND CONTROL METHOD THEREOF

(75) Inventors: Soon Bae Yang, Seoul (KR); Kwan Yeul Cho, Seoul (KR); Chan Hee Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/998,635

(22) Filed: Dec. 3, 2001

(65) Prior Publication Data

US 2003/0001537 A1 Jan. 2, 2003

(30) Foreign Application Priority Data

Jun. 29, 2001 (KR) ........................................ 2001-38218

(51) Int. Cl.[7] ................................................ H02P 7/36
(52) U.S. Cl. ...................................... 318/727; 318/254
(58) Field of Search ................................ 318/701, 727, 318/138, 254, 757, 805, 807, 811, 783, 812, 802, 822, 728–731, 439, 700, 705, 720, 799; 361/152; 324/545; 702/65, 64, 106

(56) References Cited

U.S. PATENT DOCUMENTS

| 4,884,023 | A | * | 11/1989 | Schmidt et al. | .............. | 324/772 |
| 5,896,019 | A | * | 4/1999 | Nashiki et al. | ............. | 318/701 |
| 6,366,865 | B1 | * | 4/2002 | Chalupa et al. | ............... | 702/65 |
| 6,552,509 | B2 | * | 4/2003 | Veltman | ..................... | 318/807 |

* cited by examiner

Primary Examiner—Rina Duda
Assistant Examiner—Renata McCloud
(74) Attorney, Agent, or Firm—Fleshner & Kim, LLP

(57) ABSTRACT

Disclosed is an apparatus controlling an operation of a motor and control method thereof enabling to prevent a driving force of the motor from being reduced and actuate the motor for hours stably when a washing machine is operated for hours. The present invention includes the steps of detecting a phase voltage value and a phase current value applied to the motor between forward and backward revolution sections of the motor, calculating a phase resistance value based on the detected phase voltage and current values, and controlling the operation of the motor by controlling a voltage applied to the motor in accordance with the calculated phase resistance value.

7 Claims, 3 Drawing Sheets

APPARATUS FOR CONTROLLING AN OPERATION OF MOTOR AND CONTROL METHOD THEREOF

BACKGROUND OF THE INVENTION

1. Field of the Invention

The present invention relates to an apparatus controlling an operation of a motor and control method thereof enabling to operate the motor in accordance with a phase resistance value varying by a temperature increase of the motor in a washing machine.

2. Description of the Background Art

Generally, a washing machine using a sensorless BLDC (brushless direct current) motor detects a phase current and a phase voltage applied to the motor built inside so as to actuate the motor.

FIG. 1 illustrates a constructional block diagram of a general apparatus for controlling an operation of a sensorless BLDC motor.

Referring to FIG. 1, a general apparatus for controlling an operation of a sensorless BLDC motor includes a comparator 1 outputting a comparison signal by comparing a user-demanding command speed(speed signal) $W_r$ of a motor 5 to a presumptive speed of the motor 5, a speed controller 2 outputting a speed control signal by receiving the comparison signal from the comparator 1, a current/voltage command generator 3 generating current and voltage commands by receiving the speed control signal outputted from the speed controller 2 and a position signal of a rotor of the motor 5, an inverter unit 4 converting a DC voltage generated by the voltage command into a three-phases AC voltage and outputting the converted AC voltage to the motor 5, a current/voltage detector 6 outputting a current/voltage detect signal by detecting phase voltage and current values of the three phases applied to the motor 5, and a speed/position calculation unit 7 outputting a position signal by calculating a rotor position inside the motor 5 by detecting the phase voltage and current values and outputting a speed signal by calculating a real-time speed of the motor.

Operation of the general apparatus for controlling an operation of the sensorless BLDC motor is explained as follows.

First, the comparator 1 compares the user-demanding speed (speed signal) of the motor to the presumptive speed signal of the motor and then outputs the corresponding comparison signal.

The speed controller 2 receives the comparison signal from the comparator 1 so as to output the speed control signal. Namely, the speed controller 2 based on the comparison signal outputs the speed control signal increasing the speed of the motor 5 if the calculated speed of the motor 5 is slower than the user-demanding speed of the motor 5, and the other speed control signal decreasing the speed of the motor 5 if the calculated speed of the motor 5 is faster than the user-demanding speed of the motor 5.

Thereafter, the current/voltage command generator 3 receives the speed control signal from the speed controller 2 and the position signal of the rotor inside the motor 5 from the speed/position calculation unit 7 so as to generate the current and voltage commands. The current/voltage command generator 3 then applies the current and voltage commands to the respective switching devices in the inverter unit 4. In this case, the inverter unit 4 converts the DC voltage generated by the voltage command into the three-phase AC voltage and then outputs the converted three-phase AC voltage to the motor 5. In this case, the motor 5 is driven by the three-phase AC voltage generated from the inverter unit 4.

Meanwhile, the current/voltage detector 6 detects the phase voltage and current values of the three phases applied to the motor 5 so as to output the current/voltage detect signal to the speed/position calculation unit 7.

Subsequently, the speed/position calculation unit 7 receives the phase voltage value and the phase current value from the current/voltage detector 6, calculates the received phase voltage and current values to calculate the position of the rotor in the motor 5, calculates the corresponding position signal and real speed of the motor 5, and outputs the corresponding speed signal to the current/voltage command generator 3 and the comparator 1, respectively. In this case, the speed/position calculation unit 7 calculates the speed of the motor 5 and the position of the rotor in the motor 5 using Formula 1.

Formula 1

$$K_E w_r \sin \theta_r = V_a - R i_a - L_s d i_a / dt$$

$$K_E w_r \sin (\theta_r + 120) = V_b - R i_b - L_s d i_b / dt$$

$$K_E w_r \sin (\theta_r + 240) = V_c - R i_c - L_s d i_c / dt$$

In this case, R is a resistance, $\theta_r$ is a rotor position in a motor, $L_s$ is an inductance, $W_r$ is a speed of the motor, $V_a$, $V_b$, and $V_c$ are phase voltages applied to the motor, $i_a$, $i_b$, and $i_c$, are phase currents applied to the motor, and $K_E$ is a counter electromotive force.

Unfortunately, the general apparatus for controlling an operation of the sensorless BLDC motor fails to avoid varying the phase resistance value of the motor due to the temperature increase of the motor operated for a long time, thereby being unable to precisely control an operation of the motor and reducing a driving force of the motor.

SUMMARY OF THE INVENTION

Accordingly, the present invention is directed to an apparatus controlling an operation of a motor and control method thereof that substantially obviates one or more problems due to limitations and disadvantages of the related art.

An object of the present invention is to provide an apparatus controlling an operation of a motor and control method thereof enabling to operate the motor stably and precisely by compensating the variation of a phase resistance value of the motor due to the temperature increase of the operator which is being operated.

Another object of the present invention is to provide an apparatus controlling an operation of a motor and control method thereof enabling to prevent the driving force of the motor from being decreased due to the temperature increase of the operator which is being operated.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of controlling an operation of a motor according to the present invention includes the steps of detecting a phase voltage value and a phase current value applied to the motor between forward and backward revolution sections of the motor, calculating a phase resistance value based on the detected phase voltage and current values, and controlling the operation of the motor by controlling a voltage applied to the motor in accordance with the calculated phase resistance value.

In another aspect of the present invention, an apparatus for controlling an operation of a motor includes a revolution section detect unit calculating an operational frequency of the motor based on phase voltage and current values applied to the motor and outputting a section detect signal by detecting an operational section of the motor in accordance with the calculated operational frequency, a calculation unit receiving the phase voltage and current values in accordance with the section detect signal so as to calculate a phase resistance value, a speed/position calculation unit calculating a rotor position of the motor by detecting the calculated phase resistance value and the phase voltage and current values and calculating a speed of the motor, and a voltage command generator generating a voltage command to apply a voltage to the motor based on the rotor position and the speed of the motor.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
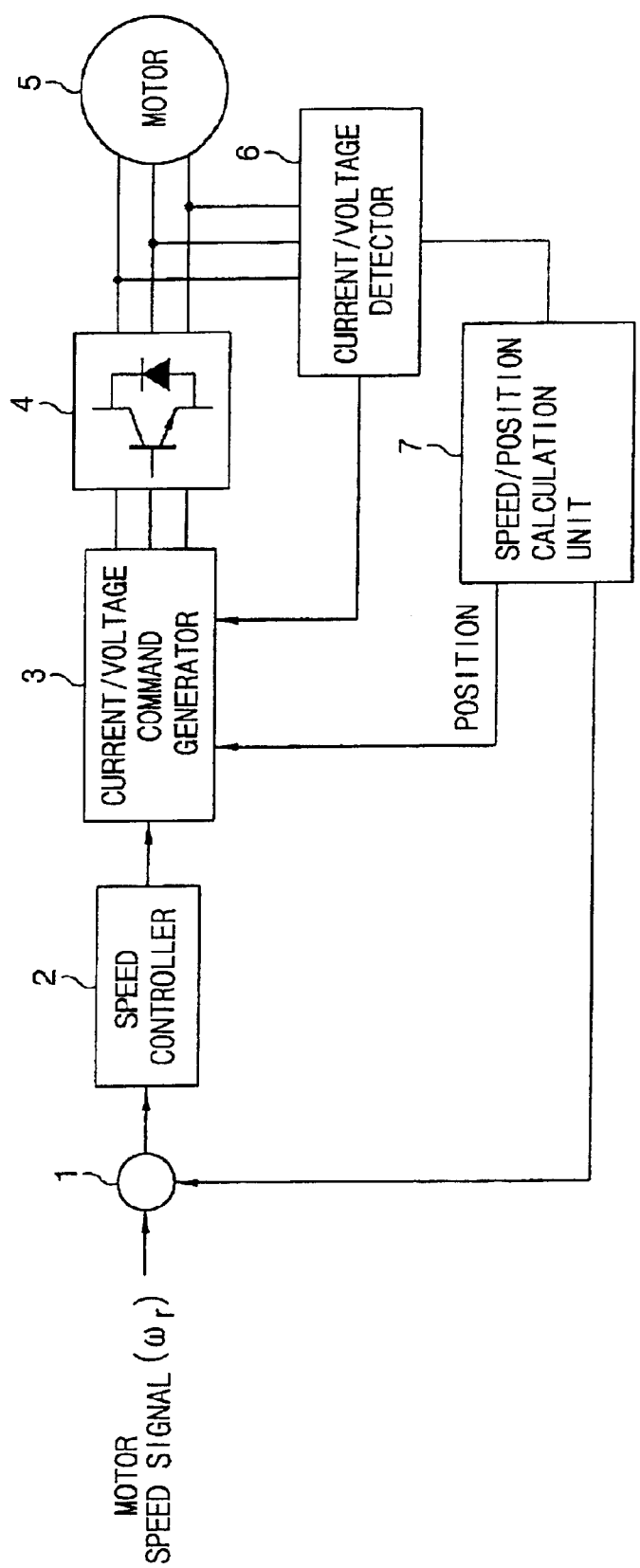
FIG. 1 illustrates a constructional block diagram of a general apparatus for controlling an operation of a sensorless BLDC motor.
Figure 2:
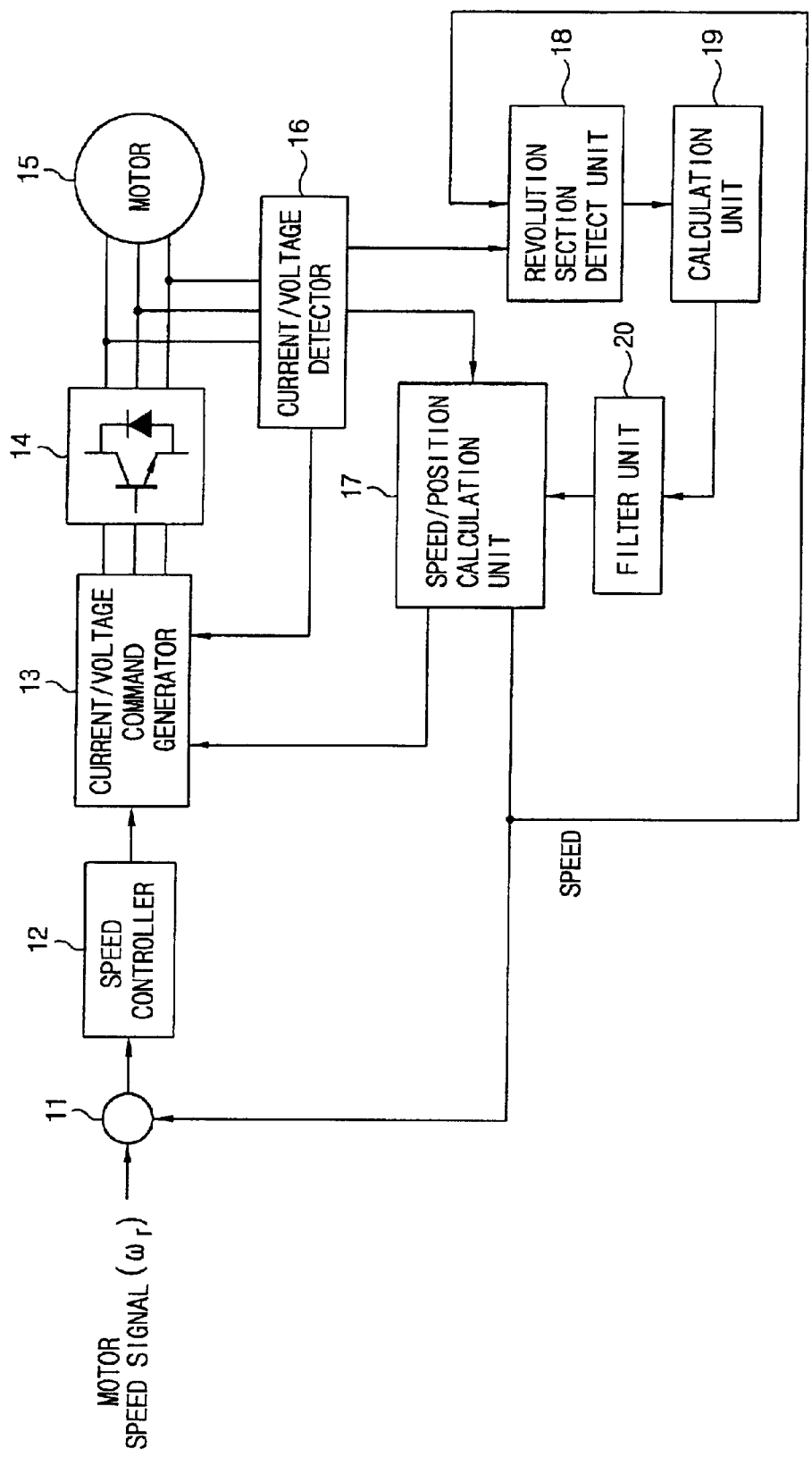
FIG. 2 illustrates a constructional block diagram of an apparatus for controlling an operation of a sensorless BLDC motor according to the present invention.

FIG. 2 illustrates a constructional block diagram of an apparatus for controlling an operation of a sensorless BLDC motor according to the present invention.

Referring to FIG. 2, an apparatus for controlling an operation of a sensorless BLDC motor according to the present invention includes a comparator 11 outputting a comparison signal by comparing a user-demanding speed (speed signal) $W_r$ of a motor 15 to a speed signal of the motor 15, a speed controller 12 outputting a speed control signal by receiving the comparison signal from the comparator 11, a current/voltage command generator 13 receiving the speed control signal outputted from the speed controller 12 and a position signal of a rotor of the motor 15 and generating current and voltage commands based on the received signals, an inverter unit 14 converting a DC voltage generated by the voltage command into a three-phase AC voltage variably and outputting the converted AC voltage to the motor 15, a current/voltage detector 16 outputting a current/voltage detect signal by detecting phase voltage and current values of three respective phases applied to the motor 15, a revolution section detect unit 18 calculating an operational frequency of the motor 15 using the phase voltage and current values and outputting a section detect signal by detecting a middle section between a forward revolution section and a backward revolution section of the motor 15 using the calculated operational frequency, a calculation unit 19 receiving the current/voltage detect signal through the revolution section detect unit 18 in accordance with the section detect signal so as to calculate a phase resistance value, a filter unit 20 finding an average value of the calculated phase resistance values, and a speed/position calculation unit 17 calculating a rotor position in the motor 15, outputting a position signal according to the rotor position, calculating a real speed of the motor 15, and outputting a speed signal according to the calculated speed. In this case, the calculation unit 19 calculates the operational frequency of the motor 15 using the phase voltage and current values and then calculates the phase resistance value between the forward and backward revolution sections of the motor based on the calculated operation frequency.

A method of controlling an operation of a sensorless BLDC motor and operation of the apparatus according to the present invention are explained in detail as follows.

First, the comparator 11 compares the user-demanding speed(speed signal) $W_r$ of the motor to a presumptive speed signal of the motor 15 and then outputs the corresponding comparison signal to the speed controller 12.

Subsequently, the speed controller 12 receives the comparison signal from the comparator 11 so as to output the corresponding speed control signal to the current/voltage command generator 13. Namely, the speed controller 12 based on the comparison signal outputs the speed control signal increasing the speed of the motor 15 if the presumptive speed of the motor 15 is slower than the user-demanding speed of the motor 15, and the other speed control signal decreasing the speed of the motor 15 if the presumptive speed of the motor 15 is faster than the user-demanding speed of the motor 15.

Thereafter, the current/voltage command generator 13 receives the speed control signal from the speed controller 12 and the presumptive position signal of the rotor inside the motor 15 from the speed/position calculation unit 17 so as to generate the corresponding current and voltage commands. The current/voltage command generator 13 then applies the current and voltage commands to the respective switching devices in the inverter unit 14.

Subsequently, the inverter unit 14 converts the DC voltage generated by the voltage command into the three-phase AC voltage variably and then outputs the converted three-phase AC voltage to the motor 15. In this case, the motor 15 is driven by the three-phase AC voltage generated from the inverter unit 14.

Thereafter, the current/voltage detector 16 detects the phase voltage and current values of the three respective phases applied to the motor 15 so as to output the corresponding current/voltage detect signal to the revolution section detect unit 18 and the speed/position calculation unit 17, respectively.

The revolution section detect unit 18 calculates the operational frequency of the motor 15 using the phase voltage and current values and outputs the corresponding section detect signal by detecting a middle section between the forward revolution section and the backward revolution section of the motor 15 using the calculated operational frequency.

In this case, when a washing machine using the sensorless BLDC motor is operated for a long time, a temperature inside the motor 15 built in the washing machine increases. At this very moment, the calculation unit 19 calculates the phase resistance value using the fact that the operational frequency of the motor 15 approaches '0' at the middle section between the forward and backward revolution sections in order to detect the temperature inside the motor 15. Namely, the calculation unit 19, if the section detect signal is inputted thereto, calculates the phase resistance value by dividing the phase voltage value by the phase current value. Then, the calculation unit 19 outputs the calculated phase resistance value to the speed/position calculation unit 17.

Besides, the calculation unit 19, when the washing machine stops operating, calculates the phase resistance values every predetermined time. In this case, the filter unit 20 finds the average value of the calculated phase average values so as to output the average value to the speed/position calculation unit 17.

The speed/position calculation unit 17 calculates the average value of the phase resistance values (or the phase resistance value), phase voltage value, and phase current value so as to calculate the rotor position of the motor 15 and then outputs the corresponding position signal to the current/voltage command generator 13. Moreover, the speed/position calculation unit 17 calculates the average value of the phase resistance values (or the phase resistance value), phase voltage value, and phase current value so as to calculate the real speed of the motor 15, outputs the corresponding speed signal to the comparator 11, and calculates the rotor position and real speed of the motor 15. Thus, the speed/position calculation unit 17 repeats this operation so as to drive the motor 15. In this case, the phase resistance value is a value varying in accordance with the temperature inside the motor 15 and the like.

The forward and backward revolution sections of the motor are explained in detail as follows.

Figure 3:
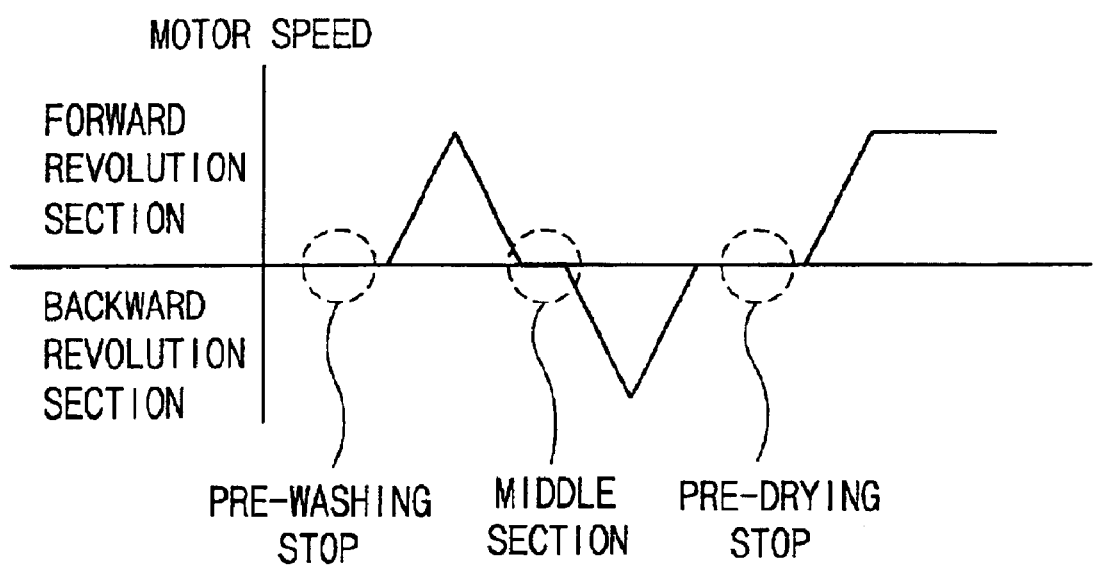
FIG. 3 illustrates a graph for forward revolution and backward revolution of a motor according to the present invention.

FIG. 3 illustrates a graph for forward revolution and backward revolution of a motor according to the present invention.

Referring to FIG. 3, the operational sections of the motor 15 built in the washing machine are constructed with a pre-washing stop section, forward and backward revolution sections on washing, and a pre-drying stop section. Namely, the present invention detects or calculates the phase resistance value when an operational section of the motor 15 on washing is at the middle section between the forward and backward revolution sections. In this case, the phase resistance value is calculated using Formula 2.

Formula 2

$$K_E w_r \sin \theta_r = V_a - R i_a - d/dt(L_s i_a)$$

In this case, R is a resistance, $\theta_r$ is a rotor position in a motor, $L_s$ is an inductance, $w_r$ is a speed of the motor, $V_a$, $V_b$, and $V_c$ are phase voltages, $i_a$, $i_b$, and $i_c$ are phase currents, and $K_E$ is a counter electromotive force.

Thereafter, the current/voltage command generator 13, based on the comparison signal, receives the speed control signal outputted from the speed controller 12 and the position signal of the rotor in the motor 15 to generate the corresponding voltage command. The current/voltage command generator 13 then outputs the voltage command to the inverter unit 14.

Subsequently, the inverter unit 14 converts the DC voltage generated by the voltage command into the three-phase AC voltage variably so as to output the converted voltage to the motor 15. In this case, the motor 15 receives the three-phase AC voltage to be driven. The level of the voltage applied to the motor 15 is proportional to a size of the calculated phase resistance value.

When a washing machine using the sensorless BLDC motor according to the present invention is operated for hours, a temperature inside the motor 15 built in the washing machine increases. At this very moment, the calculation unit 19 detects the phase resistance value using the fact that the operational frequency of the motor 15 approaches "0" at the middle section between the forward and backward revolution sections in order to precisely detect the temperature (depending on a winding inside the motor) inside the motor 15. Then, operation of the motor 15 is controlled in accordance with the temperature increase inside the motor 15 using the detected phase resistance value.

Accordingly, the present invention, when a washing machine is operated for hours, detects precisely a variation of the phase resistance value due to the temperature increase of the winding inside the motor and controls the operation of the motor in accordance with the detected phase resistance value, thereby enabling to prevent a driving force of the motor from being reduced and actuate the motor for hours stably.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An apparatus for controlling an operation of a motor, comprising:

a revolution section detect unit configured to calculate an operational frequency of the motor based on phase voltage and current values applied to the motor and configured to output a section detect signal by detecting an operational section of the motor in accordance with the calculated operational frequency, a calculation unit configured to receive the phase voltage and current values in accordance with the section detect signal and configured to calculate a phase resistance value;

a speed/position calculation unit configured to calculate a rotor position of the motor by detecting the calculated phase resistance value and the phase voltage and current values and also configured to calculate a speed of the motor; and a voltage command generator configured to generate a voltage command and apply a voltage to the motor based on the rotor position and the speed of the motor.

2. The apparatus of claim 1, wherein the operational section is a middle section between forward and backward revolution sections of the motor.

3. The apparatus of claim 1, wherein the calculation unit calculates the phase resistance value at a middle section between forward and backward revolution sections of the motor.

4. The apparatus of claim 1, wherein the motor is a sensorless brushless direct current motor.

5. The apparatus of claim 1, wherein the voltage applied to the motor is proportional to a size of the phase resistance value.

6. The apparatus of claim 1, wherein the calculation unit calculates the phase resistance value at predetermined intervals and calculates an average value of the calculated phase resistance value.

7. The apparatus of claim 1, wherein the calculation unit calculates the phase resistance value by dividing the phase voltage by the phase current when an operational frequency of the motor approaches '0'.

* * * * *